US011080956B1

(12) United States Patent
Moore

(10) Patent No.: US 11,080,956 B1
(45) Date of Patent: Aug. 3, 2021

(54) DISARMING SURVEILLANCE SYSTEMS FOR AUTHORIZED PERSONS

(71) Applicant: Angelika Moore, Kirkland, WA (US)

(72) Inventor: Angelika Moore, Kirkland, WA (US)

( * ) Notice: Subject to any disclaimer, the term of this patent is extended or adjusted under 35 U.S.C. 154(b) by 0 days.

(21) Appl. No.: 16/818,734

(22) Filed: Mar. 13, 2020

(51) Int. Cl.
*G07C 9/00* (2020.01)
*G07C 9/27* (2020.01)
*G07C 9/28* (2020.01)
*G07C 1/32* (2006.01)
*G06F 21/31* (2013.01)
*G08B 25/00* (2006.01)
*G06K 9/00* (2006.01)
*E05B 19/00* (2006.01)

(52) U.S. Cl.
CPC ...... *G07C 9/00571* (2013.01); *E05B 19/0005* (2013.01); *G06F 21/31* (2013.01); *G06K 9/00771* (2013.01); *G07C 1/32* (2013.01); *G07C 9/00896* (2013.01); *G07C 9/27* (2020.01); *G07C 9/28* (2020.01); *G08B 25/001* (2013.01); *G07C 2009/00769* (2013.01); *G07C 2009/00936* (2013.01)

(58) Field of Classification Search
None
See application file for complete search history.

(56) References Cited

U.S. PATENT DOCUMENTS

| 8,125,329 | B1 * | 2/2012 | Hirou | G08B 13/19697 340/527 |
| 2009/0153291 | A1 * | 6/2009 | Larson | G07C 9/00896 340/5.33 |
| 2014/0375422 | A1 * | 12/2014 | Huber | G07C 9/00571 340/5.61 |

* cited by examiner

*Primary Examiner* — Adolf Dsouza
(74) *Attorney, Agent, or Firm* — Terrence J. Edwards; TechLaw Ventures, PLLC

(57) ABSTRACT

Deactivating one or more components of a surveillance system in response to authenticating an authorized person is disclosed and described. A method includes authenticating a user as an authorized person with permission to enter a property and, in response to authenticating the user, causing a compartment of a lockbox to open. The method includes providing a notification to a surveillance system indicating the user has been authenticated and accessed the compartment of the lockbox.

20 Claims, 7 Drawing Sheets

Receiving An Indication That An Authorized User Has Unlocked An Onsite Device Associated With A Property.
502

In Response To Receiving The Indication, Deactivating One Or More Components Of A Surveillance System Installed At The Property.
504

Storing A Log Comprising An Identity Of The Authorized User And A Timestamp When The Authorized User Accessed The Property.
506

FIG. 5

```
Authenticating A User As An Authorized Person With Permission To Enter A Property.
602
            |
            v
In Response To Authenticating The User, Causing A Compartment Of A Lockbox To
Open.
604
            |
            v
Providing A Notification To A Surveillance System Indicating The User Has Been
Authenticated And Accessed The Compartment Of The Lockbox.
606
```

DISARMING SURVEILLANCE SYSTEMS FOR AUTHORIZED PERSONS

TECHNICAL FIELD

The disclosure relates generally to computer-based communications and particularly to communications between surveillance systems and digital lockboxes.

BACKGROUND

When a property is listed for sale, licensed real estate professionals seek access to the property to show the property to potential buyers. It can be challenging for potential buyers and real estate professionals to coordinate with the seller of the property to gain access to the property. In an effort to ease this burden, some sellers will have an analog lockbox and/or digital lockbox installed at the property such that real estate professionals can access a key to the property when the seller of the property or the seller's real estate agent are not present at the property. Some digital lockboxes are configured to authenticate persons and only provide access to the key to those people who can be authenticated as a licensed real estate professional.

Digital lockbox systems for homes listed for sale provide added security measures. However, these systems still introduce a security threat to the property and increase the likelihood that thefts or break-ins will occur at the property. Additionally, many sellers of property must deactivate and disarm the existing surveillance system at the property so that real estate professionals can tour the property with potential buyers without activating an alarm. This additionally increases the likelihood that thefts or break-ins will occur at the property.

In light of the foregoing, disclosed herein are systems, methods, and devices for deactivating one or more portions of a surveillance system in response to authenticating a user as having authorization to enter a property and/or for facilitating communications between a surveillance system and a digital lockbox.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where:

FIG. 5 is a schematic flow chart diagram of a method for deactivating one or more components of a surveillance system in response to authenticating a person as an authorized user with permission to access a property;

DETAILED DESCRIPTION

Figure 1:
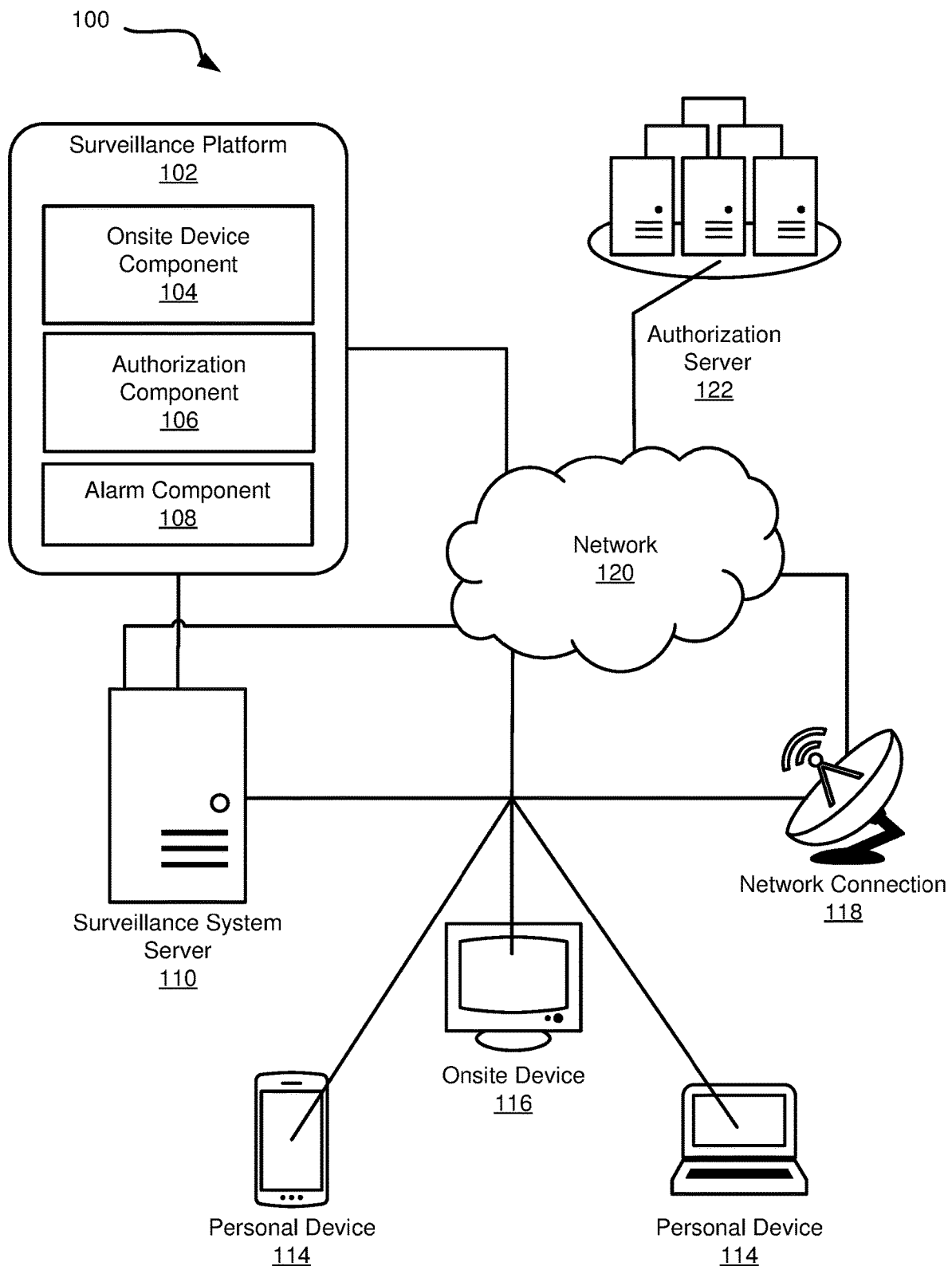
FIG. 1 is a schematic diagram of a system for facilitating communications between a surveillance platform and an onsite device such as a digital lockbox.

Disclosed herein are systems, methods, and devices for facilitating communications between a surveillance system and a digital lockbox. An embodiment of the disclosure integrates a surveillance system with a digital lockbox such that the surveillance system can be armed and disarmed in connection with the digital lockbox being opened by a real estate professional.

A lockbox is a device for securely storing an item. Lockboxes are commonly used for securely storing a key. In some instances, a lockbox is located outside a building or secured room, and the lockbox securely stores a key for accessing the building or secured room. In such an instance, the lockbox may be opened to access the key, and then the building or secured room may be opened with the key. This can be useful where multiple different people need access to the key, or a person wishes to have a spare key for emergencies, or a person wishes to have a key securely located at the property. The lockbox itself may include a compartment for storing the key, and the compartment is securely closed when the lockbox is locked. The lockbox may be unlocked with a key, a combination using a rotary dial or series of buttons, a numerical code, an alphanumerical code, combination with key control, a digital unlocking mechanism, and so forth.

A digital lockbox is a lockbox that can be locked with a digital mechanism. A digital lockbox may additionally be unlocked with an analog mechanism such as a key, a combination, a numerical code, an alphanumerical code, and so forth. In an embodiment where the digital lockbox is unlocked with a digital mechanism, the digital lockbox may be unlocked by a digital keypad input, a voice input, a code scanner input, a voice activated device input, a computer-based application input, an indication received from a security or surveillance system, and so forth. A digital lockbox may be unlocked in response to a user entering a code with a digital interface. Further, a digital lockbox may be unlocked with a computer application, such as a smart phone application that may be in communication with a server by way of a network connection. In some embodiments, a digital lockbox is unlocked using a computer application, and the computer application is configured to permit only certain persons to unlock the digital lockbox. In such an embodiment, the computer application may be configured to permit, for example, licensed professionals or an enumerated listing of persons to unlock the lockbox. This can be particularly useful when a building is offered for sale and multiple real estate professionals seek access to the property for showings.

In some instances, a digital lockbox is located outside a property that is offered for sale. The property may include a residence, such as a single family home, a multiple family home, or other residence, or a commercial property, or undeveloped or partially developed land. The digital lockbox may securely store a key for accessing the property. The digital lockbox may be opened or unlocked using a computer application, and the computer application is configured to permit only licensed real estate professionals to open the lockbox. In such an embodiment, real estate professionals may bring clients to view the property and may open the lockbox to obtain the key for opening the property by interfacing with the digital lockbox using the computer application. This enables real estate professionals to access the property without first obtaining the key from the seller of the property. Additionally, this can enable real estate professional to access the property without scheduling an appointment to view the property or even interfacing with the seller of the property. Some digital lockboxes compile a timestamped listing of all persons who have opened the digital lockbox and presumably entered the property.

Many property owners have a surveillance system of some kind. Numerous surveillance systems exist in the market with varying degrees of security. Surveillance systems may include outdoor cameras, indoor cameras, doorbell cameras, motion sensors, window sensors, door sensors, noise sensors, heat sensors, cold sensors, moisture sensors, carbon monoxide sensors, fire sensors, smoke sensors, and so forth. A surveillance system may include an alarm component that might sound an alarm at the property, might send a notification to a monitoring system, might send a notification to the property owner or some other property, might notify local law enforcement authorities, might notify local fire authorities, and so forth. Some surveillance systems will automatically send an alert to the property owner (or other authorized individual) each time a sensor is trigger, for example, each time a person is detected in a camera image, each time a motion sensor is trigger, each time a door or window is opened, and so forth. These alerts may be turned off when the system is disarmed, for example when the property owner is at home. A property owner with a home for sale may insist that the home surveillance system remain turned on when the property is shown to potential buyers. However, the property owner is unlikely to review the surveillance footage from each time when the home was shown to a potential buyer. This poses a security risk to the seller of the property.

When a home is listed for sale, the home and the neighborhood are more vulnerable to theft and break ins. For example, when a property is listed on the market for sale, next door or near neighbors may assume that each person entering the home for sale is a real estate agent, a potential buyer, a contractor, or some other person who is authorized to enter the property, and is therefore authorized to be in the neighborhood. This may not always be the case, and this assumption poses a security risk to nearby neighbors.

In some instances, a seller may refuse to have a digital lockbox or analog lockbox installed at the property when the property is for sale. This is particularly common when the seller is occupying the property during the sale process. This makes it difficult for real estate agents to show the property. Additionally, this makes the property and the neighborhood even more vulnerable to theft and break ins because there is no system of keeping records of who entered the property. This increases the likelihood of break ins and that unauthorized people will enter the property with no record that they have done so. Additionally, this increases the security risk for nearby neighbors.

Many surveillance systems create an alert when a person enters the property or is near the property. These alerts can be triggered by motion sensors, door sensors, window sensors, camera image data, and so forth. However, these alerts do not provide an indication of whether the person who has entered the property (or is near the property) is a real estate professional or other person who is authorized to enter the property. This can be a significant problem particularly when a home is being shown multiple times each day to different real estate agents and different potential buyers. An absentee property owner trying to sell the property will not have known whether an authorized individual (such as a real estate agent, contractor, potential buyer, and so forth) has entered the property, or an unauthorized person has broken into the property. Therefore, due to the number of daily showings, the property owner may be inclined to disarm the surveillance system. This, of course, increases the security risk for the property owner.

There is a need for a means to disarm a surveillance system upon entry by an authorized person who is authorized to enter the property but is not authorized to manually disarm the surveillance system. Such a system is useful when a property is listed for sale. In such an instance, the system can enable a real estate professional to automatically disarm the surveillance system upon entering the property with a potential buyer. Such a system may be useful when a property is being cleaned, updated, fixed, listed for rent, currently being rented, in the process of a remodel, being repaired or restored, under development by contractors, or otherwise worked on by an authorized contractor. Additionally, such a system may be useful when the property is subject to a current or potential crime scene due to break in, theft, burglary, or other crimes subject to law enforcement investigations. In an embodiment, an authorized person is granted access to the property, and the surveillance system is automatically disarmed to permit the authorized person to enter the property without triggering an alarm or a notification to law enforcement authorities. In an embodiment, the surveillance system remains active such that cameras are still capturing a video stream, motion sensors are still tracking motion, and so forth, but the surveillance system does not sound an alarm or otherwise trigger a notification to authorities. In an embodiment, the system provides a notification to the property owner that an authorized person has entered the property and is currently within the property.

In light of the foregoing, disclosed herein are systems, methods, and devices for facilitating communications between a surveillance system and a digital lockbox and/or for permitting authorized persons to enter a property and automatically disarm one or more portions of the surveillance system at the property. Embodiments of the disclosure enable an authorized professional to enter a property with a surveillance system without triggering an alarm by the surveillance system or an automated notification that an active break-in is occurring at the property. Additionally, embodiments of the disclosure enable a real estate professional to retrieve a key to a property from a digital lockbox, and then enter the property with the key without triggering an alarm by the surveillance system at the property. Such systems, methods, and devices disclosed herein can notify a property owner that a real estate professional is currently at the property, and that the surveillance system alarm has been disarmed to permit the real estate professional to view the property.

Before the structures, systems, and methods for integrating a surveillance system with a digital lockbox are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Referring now to the figures, FIG. 1 is a schematic diagram of a system 100 for facilitating communications between a surveillance system and an onsite device such as a digital lockbox. The system 100 can be implemented with any surveillance system. In some embodiments, the system 100 enables the surveillance system to be disarmed when an authorized person enters the property and does not require the use of an onsite device such as a digital lockbox.

The system 100 includes a surveillance platform 102 in communication with a surveillance platform server 110 and a network 120. The network 120 is in communication with the surveillance system server 110 and an authorization server 122. Access to the network 120 may be provided onsite at a property, such as a residence, commercial building, land, or other real property, by way of a network connection 118 that may be connected with the surveillance system server and/or individual devices such as an onsite device 116 and/or a personal device 114.

The surveillance platform 102 includes one or more of an onsite device component 104, an authorization component 106, and an alarm component 108. The surveillance platform 102 may include further components and may be configured to perform additional instructions, for example according to the surveillance platform 102 as discussed in FIG. 2. The surveillance platform 102 can be accessed by way of an onsite device 116 that may be temporarily installed or permanently fixed at the property. The onsite device 116 may include a digital lockbox storing a key to enter the property or may include some other type of onsite device 116 as deemed appropriate. The surveillance platform 102 may further be accessed by way of a personal device 114 such as a smart phone, a tablet, a laptop, a personal computer, and so forth.

The onsite device component 104 of the surveillance platform 102 communicates with the onsite device 116 to disarm or otherwise alter the function of the surveillance system. In an embodiment, the onsite device 116 is a digital lockbox with a compartment for securely storing a key to the property. The onsite device 116 may be configured to open in response to receiving a passcode, scannable code, or other indication from a licensed real estate professional or other authorized person. The onsite device 116 may further be configured to store a timestamped log of all persons who have opened the onsite device 116 to retrieve the key to the property. In an embodiment, the onsite device 116 is in communication with the onsite device component 104 and provides an indication to the surveillance platform 102 that an authorized person has retrieved the key to enter the property. The surveillance platform 102, in response to receiving the indication from the onsite device 116, may disarm or otherwise alter the function of the surveillance system. In an embodiment, the onsite device component 104 causes the surveillance sensors to continue to operate but discontinues one or more alarms or notifications triggered by the surveillance system. In an embodiment, the onsite device component 104 triggers a notification to be sent to the property owner or other manager of the security system, indicating that an authorized person has retrieved the key from the onsite device 116 and has entered the property.

In an embodiment, the onsite device component 104 provides access to transaction information such as who has entered the property, when they entered the property, how long they were at the property, video footage of the person(s) at the property, motion sensor data when the person(s) were at the property, whether the person armed the system upon leaving the property, and so forth.

The authorization component 106 of the surveillance platform 102 provides access to the property after authorizing a person to enter the property. The authorization component 106 may receive an indication from the onsite device 116 that a person has been authorized by the onsite device 116, has opened the onsite device 116, and will likely enter the property with the key stored in the onsite device 116. The authorization component 106 may make authorize a person to enter the property independent of the onsite device 116. In an embodiment, the authorization component 106 is in communication with a code reader configured to scan a code indicating that a person is authorized to enter the property. In an embodiment, the authorization component 106 is in communication with a digital code-receiving device, such as a touch screen, a fingerprint sensor, a retina sensor, a keypad, and so forth, and the authorization component 106 may thereby receive an indication that a person has submitted a code as proof of authorization to enter the property.

The alarm component 108 of the surveillance platform 102 disarms one or more alarms or notifications by the surveillance platform 102 in response to an authorized person entering the property. In an embodiment, the alarm component 108 disarms or deactivates the entire surveillance platform 102 such that no sensors are active when the authorized person is at the property. In an embodiment, the alarm component 108 ensures that sensors remain active while the person is at the property but disarms any noise-emitting alarms, notifications to law enforcement, notifications to monitoring agencies, and so forth, while the authorized person is at the property. In an embodiment, alarm component 108 triggers a notification to be sent to the property manager or property owner indicating that an authorized person has entered the property.

The surveillance system server 110 provides access to the surveillance platform 102 to onsite devices 116 and/or personal devices 114. The surveillance system server 110 may serve as a dedicated server group to support the surveillance platform 102 for all devices (see 116, 114) interacting with the surveillance platform 102.

The onsite device 116 is a device that is located onsite at the property. In an embodiment, the onsite device 116 is a digital lockbox comprising a compartment for storing a key to the property. In an embodiment, the digital lockbox is specifically programmed to open only for licensed real estate professionals such that licensed real estate professional can enter the property for a showing. In an embodiment, the digital lockbox is programmed to open for specific authorized individuals. The digital lockbox may comprise a scanner for scanning any suitable code, such as a QR code or barcode generated by a computer application. In an embodiment, the computer application is processed by a personal device 114. The onsite device is in communication with the surveillance platform 102 by way of the network 120 and can thereby receive an indication over the network 120 of the identity of persons who are authorized to enter the property.

In an embodiment, the onsite device 116 is an automated door lock configured to unlock a deadbolt and/or hand lock on a door in response to authenticating a user as having permission to enter a property. In an embodiment, the onsite device 116 is a keypad, touchpad, or scanner device connected to a locking mechanism of a door. In an embodiment, the onsite device 116 is configured to authenticate the identity of a person and/or determine whether the person is authorized to enter the property, and then unlock the property on the person's behalf. In such an embodiment, the property is unlocked for the authorized user without giving the authorized user access to a key to the property or requiring the authorized user to manually unlock the property. As discussed herein, a "digital lockbox" encompasses an automated door lock that can automatically unlock a door without providing a user access to a key to the property.

In an embodiment, the onsite device 116 is not actually located on the property but is a component part of an integrated network or cloud network security system where there may not be a physical device present at the property but instead a computer-based application may operate the system though the existing networks 120 utilizing a network connection 118 such as Wi-Fi or cellular connection. For example, in such an embodiment, a surveillance system may be in communication with a network and may have the ability to unlock a door or window or other entrance at the house. The onsite device 116 may constitute a communication with the surveillance system that enables an authorized person to enter the property. In such an embodiment, the connection may be installed and managed by the property owner or a security/surveillance monitoring entity.

The personal device 114 is any personal computing device that can communicate with the surveillance system server 110 and/or the onsite device 116. The personal device 114 may include a smart phone, a tablet, a laptop, a personal computer, and so forth. Personal devices 114 may communicate with the surveillance system server 110 by way of a local area network (LAN), wide area network (WAN), or another network connection. In an embodiment, personal devices 114 can connect to a network 120, such as a cloud computing network or the Internet, by way of a network connection 118 that may be facilitated by the surveillance system server 110.

The authorization server 122 may be located offsite at a location that is remote to the property. The authorization server 122 may include a log of persons who are authorized to enter the property. The log of persons who are authorized to enter the property may include, in one example implementation, all licensed real estate professionals within a region. The log of persons may include specific identified persons. The log of persons may include specific contractors, cleaners, managers, or other persons who are given permission to access the property. The log of persons may include friends, relatives, or neighbors who are authorized to enter the property. The log of persons may include an indication of specific dates, times, or durations of time that each of the persons is authorized to enter the property. In an embodiment, the log of persons indicates that all licensed real estate professionals within the region are authorized to enter the property, but only on certain days, at certain times, and/or for a defined duration of time.

The authorization server 122 may be in communication with a network 120 such as a cloud computing network. In an embodiment, the surveillance system server 110 is in communication with the authorization server 122 by way of the network 120 such that new profiles of authorized persons may be uploaded from the authorization server 122 to the surveillance system server 110. In an embodiment, a single server includes the information stored in the authorization server 122 and the surveillance system server 110. In an embodiment, the information stored in the authorization server 122 includes sensitive information such as personally identifiable information, and the information is therefore encrypted and safeguarded.

In an embodiment as illustrated in FIG. 1, the surveillance system server 110 is independent of the authorization server 122. This may be desirable in an instance where the surveillance platform 102 connects to a third-party server or database that comprises user profile information for authorized persons. For example, a third-party service might exist that catalogs user profile information for numerous retail establishments. The surveillance platform 102 may connect with such a third-party service to obtain user profile information. The surveillance platform 102 may receive user profile information from a third-party user profile service by way of the authorization server 122.

In an embodiment (not shown in FIG. 1), the surveillance system server 110 and the authorization server 122 are not independent of one another. In such an embodiment, a single server group may include all information necessary for running the surveillance platform 102, including user profile information, payment information, transaction history, and/or information specific to one or more retail establishments. It should be appreciated that numerous different configurations may be used without departing from the scope of the disclosure.

The network connection 118 provides users access to the network 120. The network 120 may include a cloud computing network, and/or the Internet, and/or part of a closed or private network. The network connection 118 may provide the surveillance system server 110 access to the network 120 and may further provide any of the onsite devices 116 and/or personal devices 114 access to the network 120.

Figure 2:
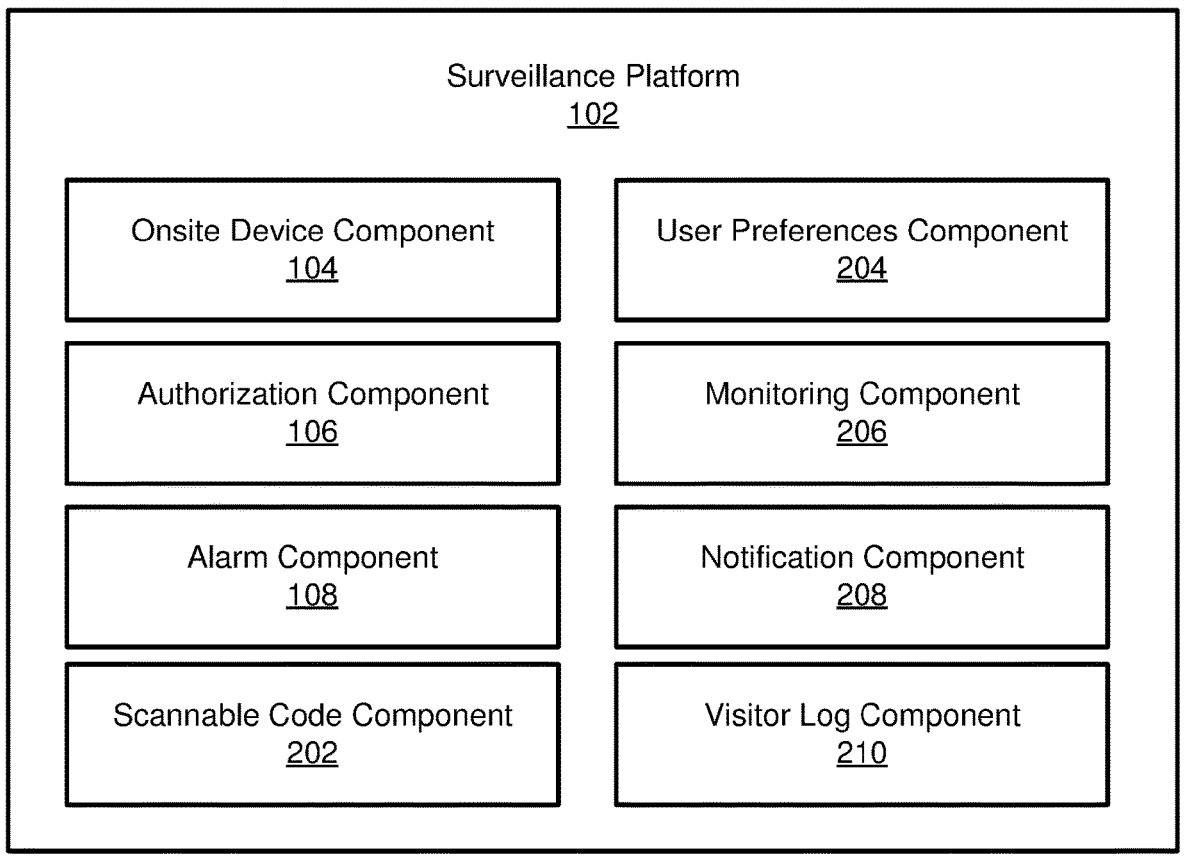
FIG. 2 is a block diagram of components of a surveillance platform.

FIG. 2 is a block diagram of the surveillance platform 102. The surveillance platform 102 includes the onsite device component 104, the authorization component 106, and the alarm component 108 as discussed in FIG. 1. The surveillance platform 102 may further include one or more of the scannable code component 204, the user preferences component 204, the monitoring component 206, the notification component 208, the visitor log component 210, and other components as deemed necessary based on the implementation.

For purposes of illustration, programs and other executable program components are shown herein as discrete blocks, although it is understood that such programs and components may reside at various times in different storage components of a computing device and are executed by one or more processors. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "component" is intended to convey the implementation apparatus for accomplishing a process, such as by hardware, or a combination of hardware, software, and/or firmware, for the purposes of performing all or parts of operations disclosed herein. The terms "component" is intended to convey independence in how the modules, components, or their functionality or hardware may be implemented in different embodiments.

The scannable code component 202 stores information about a scannable code associated with a certain authorized person or account. When the scannable code is scanned by a component of the surveillance system itself and/or an onsite device 116, the surveillance platform 102 can look up the appropriate authorized person or account. The surveillance platform 102 can thereby independently determine whether the person is authorized to enter the property.

The user preferences component 204 stores information pertaining to a user's account with the surveillance platform 102. The user preferences component 204 may store information about the property owner or property manager. In an embodiment, the user preferences component 204 stores information about when the property owner is typically home, when the property owner allows others to visit the property, contact information for the property owner, and so forth.

The monitoring component 206 is in communication with sensors at the property. The monitoring component 206 may estimate whether a person is present at the property based on data received from the sensors at the property. The monitoring component 206 may determine whether a person is currently at the property, where the person is within the property, and whether the authorized person brought guests to the property. In an embodiment, the monitoring component 206 is in communication with a deep neural network trained to determine whether a real estate professional is at the property with one or more prospective buyers. This determination may be made based on sensor data indicating, for example, how many people are at the property, where the persons are located within the property, and whether the persons appear to be behaving as prospective buyers touring the property.

The notification component 208 monitors notifications sent to the property owner and/or property manager, law enforcement officials, fire department officials, a monitoring agency or service, and so forth. In an embodiment, the notification component 208 notifies the property owner when an authorized person has entered the property and when the authorized person has departed the property. In an embodiment, the notification component 208 notifies the property owner when the alarm system has been disarmed or armed. In an embodiment, the notification component 208 provides a live video stream of an authorized person at the property, based on sensors in communication with the surveillance platform 102.

The visitor log component 210 stores a timestamped log of authorized and/or unauthorized persons who have visited the property. The visitor log component 210 may store video and/or camera image footage in connection with log entries of when persons visited the property.

Figure 3:
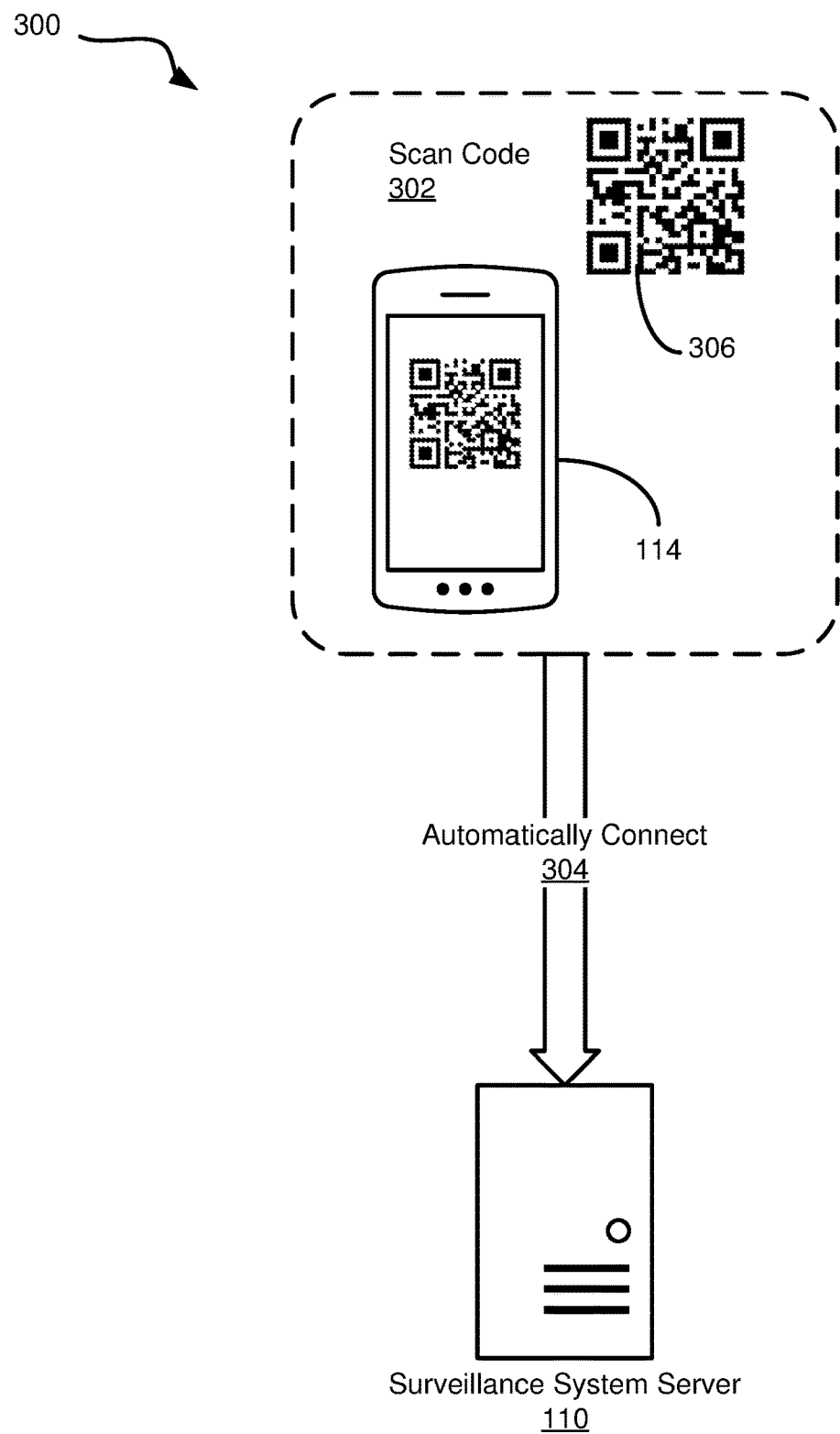
FIG. 3 is a schematic diagram of a process flow for associating a scannable code with an authorized user seeking access to a property.

FIG. 3 is a schematic diagram of a system 300 for communicating with the surveillance system server 110 to authorize a person and/or receive an indication that a person has been authorized by another device, such as an onsite device 116. In an embodiment, a scannable code 306 is provided and an onsite device 116 and/or a personal device 114 and/or a code scanner integrated with the surveillance platform 102 can scan the code (see 302) to automatically connect (see 304) to the surveillance system server 110. In an embodiment, the onsite device 116 scans the code and the onsite device 116 is in communication with the surveillance system server 110 to provide an indication that a person will enter the property.

The scannable code 306 may be any scannable figure or code that is readable by a device, such as a digital lockbox or other code reader. In an embodiment, the scannable code 306 is a two-dimensional barcode such as a quick response (QR) code. The two-dimensional barcode can be digitally scanned by a camera or other sensor on the onsite device 116 and/or personal device 114. In an embodiment, the scannable code 306 is designed to appear like a graphic or image and the two-dimensional barcode is integrated or "hidden" in the image. The scannable code 306 may include multiple squares that can be read by the image sensor of the personal device 114. In an embodiment, the scannable code 306 is presented on the screen of a personal device such as a mobile phone.

In an embodiment where the scannable code 306 is a QR code, the code includes three large squares (the three large squares can be seen in the upper-left, lower-left, and upper-right corners of the example scannable code 306 shown in FIG. 3) that serve as alignment targets while a smaller square in a remaining corner of the scannable code 306 (the smaller square can be seen near the lower-right corner of the example scannable code 306 shown in FIG. 3) serves to normalize the angle with which the image sensor hits the scannable code 306. The remaining area of the scannable code 306 is the actual data that is converted into binary code by the personal device 114. The scannable code 306 may include many characters worth of data. In an example where the scannable code 306 is a 117-pixel square, the code may hold 1852 characters of data.

In an embodiment, an image sensor of the onsite device 116 and/or personal device 114 is directed to scan the scannable code 306, and the scannable code 306 includes instructions for the onsite device 116 and/or personal device 114 to connect to the surveillance system server 110. A processor of the onsite device 116 and/or personal device 114 may execute the instructions stored in the scannable code 306 to automatically connect 304 to the surveillance system server 110.

Figure 4:
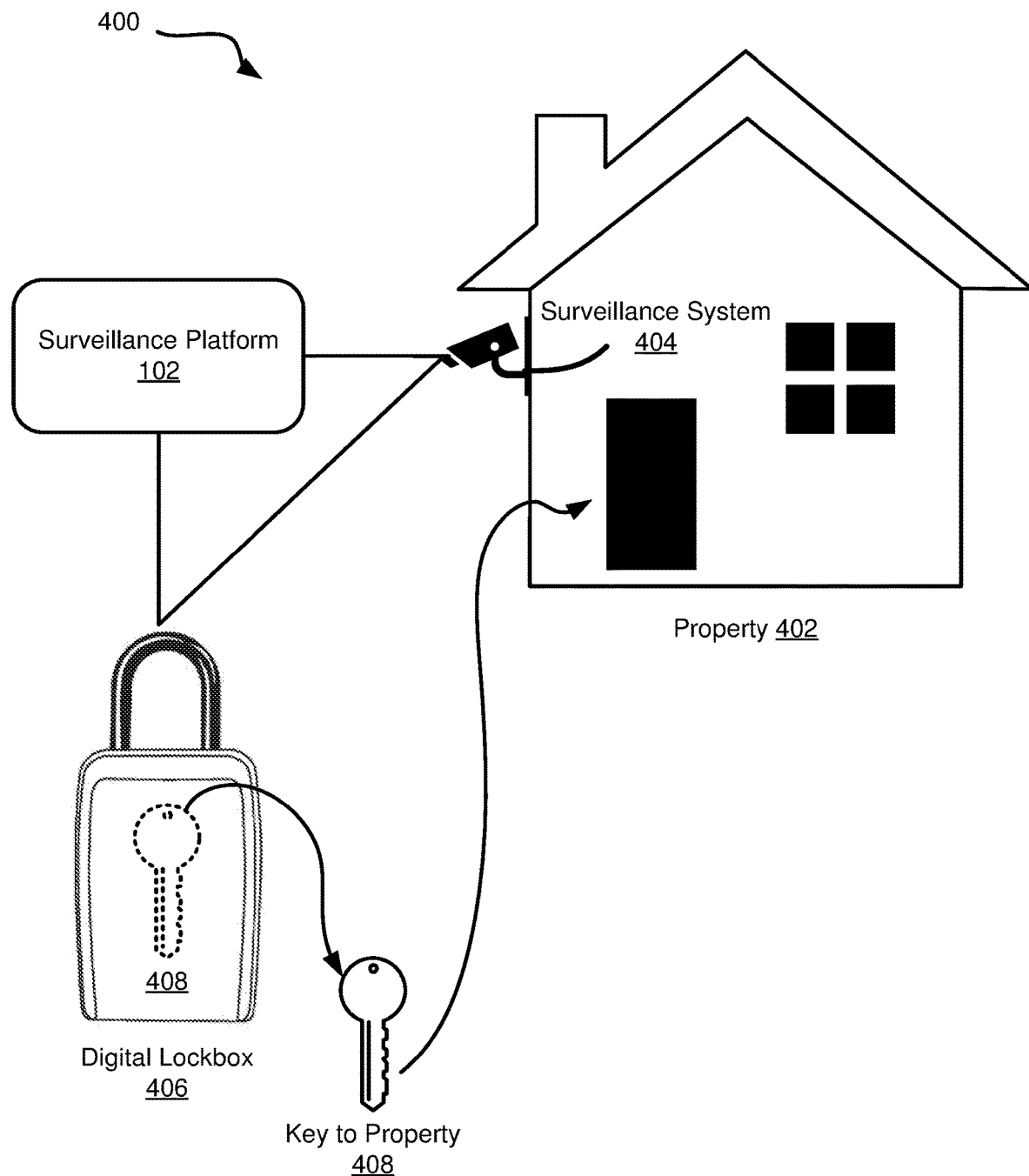
FIG. 4 is a schematic diagram illustrating communications between a digital lockbox and a surveillance system.

FIG. 4 is a schematic diagram of a system 400 for communications between a surveillance system 404 and a digital lockbox 406. The system 400 may be useful in a real estate transaction use-case, wherein a property 402 is listed for sale and multiple real estate agents are visiting the property 402. In such a use-case, the multiple real estate agents may provide proof of identity to the digital lockbox 406, and the digital lockbox 406 may thereby enable the real estate agent to retrieve the key 408 to the property 402 and then accessed the property 402 with the key 408. The digital lockbox 406 may be in communication with the surveillance platform 102 and/or the surveillance system 404 of the property 402. The surveillance system 404 at the property 402 may be disarmed in response to a person retrieving the key 408 from the digital lockbox 406 and/or in response to a person verifying authorization to enter the property 402 with the digital lockbox 406.

The digital lockbox 406 may be any suitable digital lockbox 406 known in the art. In an embodiment, the digital lockbox 406 includes a scanner for scanning a scannable code 306 that may be presented on a personal device 114 such as a mobile phone. In an embodiment, a real estate agent registers an account with a server associated with the digital lockbox 406. The real estate agent provides evidence of legal licensure to practice real estate within a certain region. The real estate agent may then open the compartment of the digital lockbox 406 by signing into the account associated with the digital lockbox 406 server, and then presenting a scannable code 306 to be read by the digital lockbox 406. The digital lockbox 406 may open in response to scanning the scannable code 306 associated with the real estate agent's account. The digital lockbox 406 may additionally store a timestamped log indicating the identity of the real estate agent who opened the digital lockbox 406 and presumably entered the property 402.

In an embodiment, the digital lockbox 406 includes a keypad for inputting a code to unlock the digital lockbox 406 and obtain the key to the property 408. The digital lockbox 406 may include a rotary dial, rotary number dials, or some other analog means for inputting a code to unlock the digital lockbox 406. The digital lockbox 406 may include a scanner for scanning a code to unlock the digital lockbox 406. The code to be scanned by the digital lockbox 406 may be presented on a personal device such as a mobile phone, computer, or other device, or may be presented on a sheet of paper or other substance where a code may be printed. In an embodiment, the digital lockbox 406 is unlocked by inserting a key (separate from the key to the property 408 stored within the digital lockbox 406) to unlock the compartment of the digital lockbox 406. It should be appreciated that the digital lockbox 406 may include any suitable digital lockbox 406 without department from the scope of the disclosure.

In an embodiment, the digital lockbox 406 is connected to a door of the property 402. The digital lockbox 406 might not be a traditional lockbox with a compartment for holding a key, but may instead be connected to the door to automatically unlock a deadbolt and/or handle of the door in response to authenticating a user as having authorization to access the property.

In an embodiment, the digital lockbox 406 is in communication with the surveillance system 404 and/or the surveillance platform 102 by way of a network connection 118 and over a network 120. The digital lockbox 406 may provide a notification to the surveillance platform 102 and/or the surveillance system 404 indicating that an authorized person (i.e., a licensed real estate professional) has opened the digital lockbox 406 and will presumably enter the property 402. In response to receiving this notification, the surveillance platform 102 and/or the surveillance system 404 disarms some portion of the surveillance system 404. In an embodiment, the surveillance system 404 remains active but one or more alarms and/or notifications are deactivated. In an embodiment, the surveillance platform 102 sends a notification to the property owner indicating that a licensed real estate professional has entered the property 402.

The surveillance system 404 may be any suitable surveillance system 404 known in the art. In an embodiment, the surveillance system 404 is an existing surveillance system 404 that was installed at the property 402 prior to the property 402 being listed for sale. The surveillance system 404 is in communication with the surveillance platform 102 and may additionally be in communication with the digital lockbox 406.

FIG. 5 is a schematic diagram of a method 500 for deactivating one or more components of a surveillance system. In an embodiment, the method 500 is performed by a surveillance system 404, a surveillance platform 102, a surveillance system server 110, and/or an authorization server 122. The method 500 may be performed by a component of a surveillance system in connection with an onsite device 116 such as a digital lockbox. The method 500 may be performed by any suitable computing device.

The method 500 begins and a computing device receives at 502 an indication that an authorized user has unlocked an onsite device associated with a property. The method 500 continues and a computing device deactivates at 504 one or more components of a surveillance system installed at the property in response to receiving the indication that the authorized user has unlocked the onsite device. The method 500 continues and a computing device stores at 506 a log comprising an identity of the authorized user and a timestamp when the authorized user accessed the property.

Figure 6:
FIG. 6 is a schematic flow chart diagram of a method for authenticating a user and providing a notification to a surveillance system indicating that the user has been authenticated.

FIG. 6 is a schematic diagram of a method 600 for authenticating a user seeking access to a property. The method 600 may be performed by an authentication device such as an onsite device 116 like a digital lockbox. The method 600 may be performed by an authentication components of a surveillance system 404. The method 600 may be performed by any suitable computing device.

The method 600 begins and a computing device authenticates at 602 a user as an authorized person with permission to enter a property. The method 600 continues and a computing device causes at 604 a compartment of a lockbox to open in response to authenticating the user. The method 600 continues and a computing device provides at 606 a notification to a surveillance system indicating the user has been authenticated and accessed the compartment of the lockbox.

Figure 7:
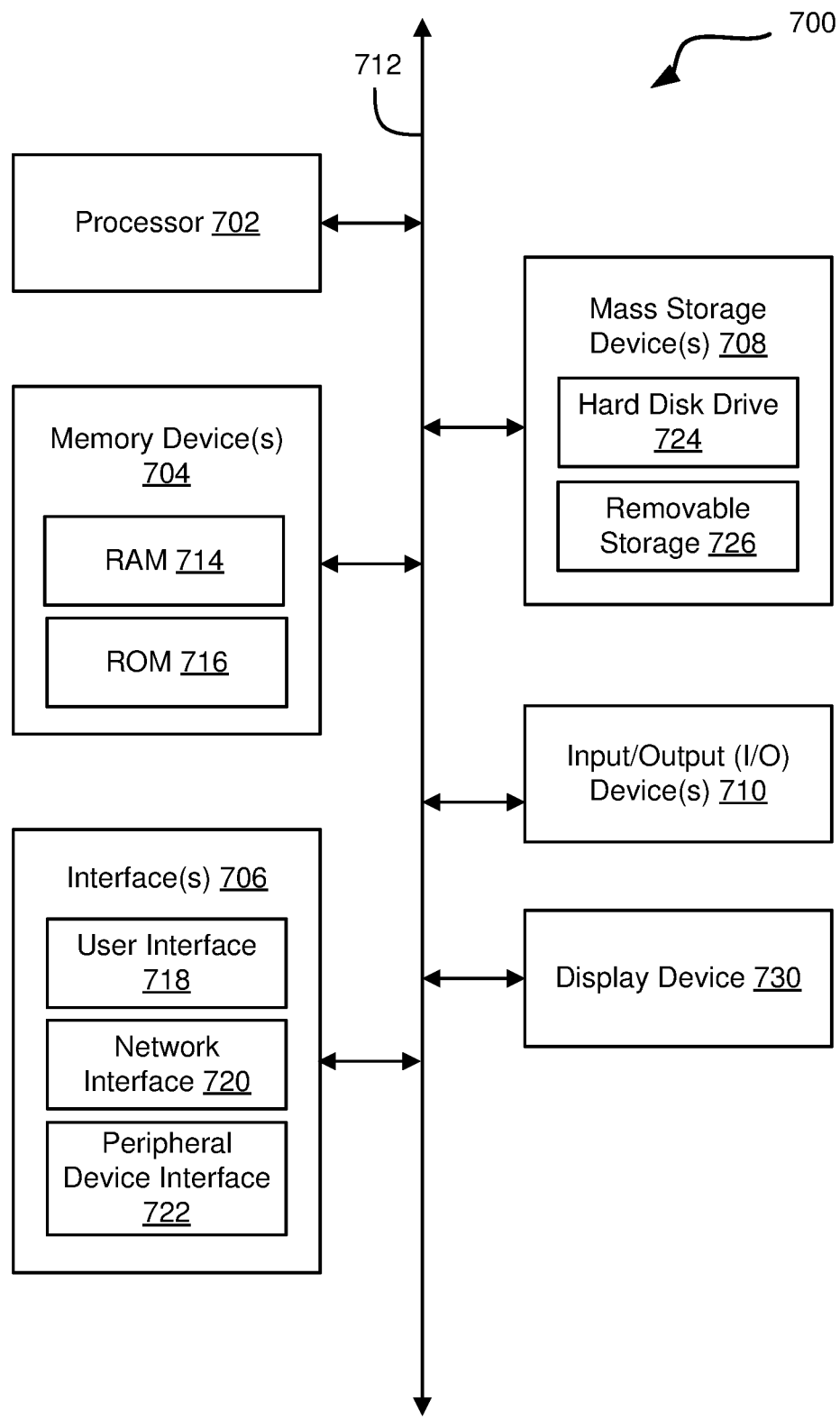
FIG. 7 illustrates components of an example computing device.

Referring now to FIG. 7, a block diagram of an example computing device 700 is illustrated. Computing device 700 may be used to perform various procedures, such as those discussed herein. Computing device 700 can perform various monitoring functions as discussed herein, and can execute one or more application programs, such as the application programs or functionality described herein. Computing device 700 can be any of a wide variety of computing devices, such as a desktop computer, in-dash computer, vehicle control system, a notebook computer, a server computer, a handheld computer, tablet computer and the like.

Computing device 700 includes one or more processor(s) 704, one or more memory device(s) 704, one or more interface(s) 706, one or more mass storage device(s) 708, one or more Input/output (I/O) device(s) 710, and a display device 730 all of which are coupled to a bus 712. Processor(s) 704 include one or more processors or controllers that execute instructions stored in memory device(s) 704 and/or mass storage device(s) 708. Processor(s) 704 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device 708 is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 may include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, or any suitable user interface now known to those of ordinary skill in the field, or later discovered), keyboards, and the like.

Bus 712 allows processor(s) 704, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE bus, USB bus, and so forth.

EXAMPLES

The following examples pertain to further embodiments.

Example 1 is a method. The method includes receiving an indication that an authorized user has unlocked an onsite device associated with a property. The method includes, in response to receiving the indication, deactivating one or components of a surveillance system installed at the property. The method includes storing a log comprising an identity of the authorized user and a timestamp when the authorized user accessed the property.

Example 2 is a method as in Example 1, wherein the onsite device is a digital lockbox comprising a secured compartment for storing a key to the property.

Example 3 is a method as in any of Examples 1-2, wherein the authorized user is a licensed real estate professional seeking access to the property when the property is listed for sale, and wherein the digital lockbox is configured to open a secured compartment for storing a key to the property only to licensed real estate professionals.

Example 4 is a method as in any of Examples 1-3, wherein deactivating the one or more components of the surveillance system comprises deactivating one or more of: a noise alarm; a notification to a law enforcement official and/or a fire department official; a notification to a surveillance monitoring service; a notification to an owner of the property and/or a manager of the property; a motion sensor installed at the property; or a camera installed at the property.

Example 5 is a method as in any of Examples 1-4, further comprising: in response to receiving the indication, activating a camera installed as part of the surveillance system installed at the property to capture a video stream of the property; determining whether the authorized user has entered the property; in response to determining the authorized user has entered the property, providing a notification to an owner of the property and/or a manager of the property with an indication that the authorized user has entered the property; and storing the video stream of the property such that the owner of the property and/or the manager of the property can view the video stream.

Example 6 is a method as in any of Examples 1-5, further comprising: in response to receiving the indication, activating a camera installed as part of the surveillance system installed at the property to capture a video stream of the property; and providing the video stream of the property to a deep neural network to determine whether the authorized user has entered the property.

Example 7 is a method as in any of Examples 1-6, further comprising: determining whether a person has entered the property based on data received from one or more sensors installed as part of the surveillance system installed at the property; in response to determining the person has entered the property, estimating when the person departed the property based on data received from the one or more sensors; and in response to determining when the person departed the property, providing a notification to an owner of the property and/or a manager of the property indicating the person has departed the property.

Example 8 is a method as in any of Examples 1-7, further comprising: determining whether a person has entered the property based on data received from one or more sensors installed as part of the surveillance system installed at the property; in response to determining the person has entered the property, estimating when the person departed the property based on data received from the one or more sensors; and in response to determining the person has departed the property, reactivating the one or more components of the surveillance system that were deactivated in response to receiving the indication.

Example 9 is a method as in any of Examples 1-8, further comprising: determining a person has entered the property based on data received from one or more sensors installed as part of the surveillance system installed at the property; receiving a video stream captured by a camera installed as part of the surveillance system installed at the property; and providing the video stream to a deep neural network trained to determine whether the person likely comprises a real estate professional.

Example 10 is a method as in any of Examples 1-9, wherein the onsite device is a component of the surveillance system and is configured to read a scannable code to determine whether the authorized user has authorization to enter the property.

Example 11 is a method. The method includes authenticating a user as an authorized person with permission to enter a property. The method includes, in response to authenticating the user, causing a compartment of a lockbox to open. The method includes providing a notification to a surveillance system indicating the user has been authenticated and accessed the compartment of the lockbox.

Example 12 is a method as in Example 11, wherein authenticating the user comprises authenticating by scanning a scannable code, and wherein the compartment of the lockbox is configured to hold a key to the property.

Example 13 is a method as in any of Examples 11-12, wherein authenticating the user comprises determining that the user is a licensed real estate professional with authority to access the property when the property is for sale.

Example 14 is a method as in any of Examples 11-13, wherein authenticating the user further comprises determining the licensed real estate professional has authority to access the property at the time when the authenticating the user occurred.

Example 15 is a method as in any of Examples 11-14, wherein providing the notification to the surveillance system comprises providing the notification to a server in communication with the surveillance system over a network.

Example 16 is a method as in any of Examples 11-15, wherein providing the notification to the surveillance system comprises providing an indication that the compartment of the lockbox has been opened, and the user is likely to enter the property.

Example 17 is a method as in any of Examples 11-16, further comprising providing a notification to an owner of the property and/or a manager of the property indicating that the user has been authenticated as an authorized user, and that the user has caused the compartment of the lockbox to open.

Example 18 is a method as in any of Examples 11-17, further comprising storing a log entry comprising an identity of the user and a timestamp when the user was authenticated.

Example 19 is a method as in any of Examples 11-18, further comprising, in response to causing the compartment of the lockbox to open, deactivating one or more component of a surveillance system installed at the property, wherein the one or more components comprises: a noise alarm; a notification to a law enforcement official and/or a fire department official; a notification to a surveillance monitoring service; a notification to an owner of the property and/or a manager of the property; a motion sensor installed at the property; or a camera installed at the property.

Example 20 is a method as in any of Examples 11-19, further comprising, in response to causing the compartment of the lockbox to open: activating a camera installed as part of the surveillance system installed at the property to capture a video stream of the property; determining whether the user has entered the property; in response to determining the user has entered the property, providing a notification to an owner of the property and/or a manager of the property with an indication that the user has entered the property; and storing the video stream of the property such that the owner of the property and/or the manager of the property can view the video stream.

Example 21 is a system comprising one or more processors configurable to execute instructions stored in non-transitory computer readable storage medium, wherein the instructions comprise any of the method steps recited in any of Examples 1-20.

Example 22 is non-transitory computer readable storage medium storing instructions for execution by one or more processors, wherein the instructions comprise any of the method steps recited in any of Examples 1-20.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, televisions, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   receiving a code input comprising a unique code, wherein the unique code is assigned to an account that is supported by a server in communication with a lockbox;
   authenticating a user based on the code input;
   accessing an authorization log to determine whether the user has permission to enter a property at a current time, wherein the authorization log comprises a listing of persons with authorization to access the property on certain dates and times;
   in response to determining the user has permission to enter the property at the current time, causing a compartment of the lockbox to open;
   providing a notification to a surveillance system indicating the user has been authenticated and accessed the compartment of the lockbox, wherein the notification comprises an identify of the user; and
   updating a timestamped visitor log for the property to indicate that the user accessed the property.

2. The method of claim 1, wherein authenticating the user comprises authenticating by scanning a scannable code, and wherein the compartment of the lockbox is configured to hold a key to the property.

3. The method of claim 1, wherein determining whether the user has permission to enter the property at the current time comprises determining that the user is a licensed real estate professional with authority to access the property when the property is for sale based on the authorization log.

4. The method of claim 1, wherein determining whether the user has permission to enter the property at the current time further comprises determining the user is one or more of a visitor, real estate agent, interested buyer, registered guest, or contractor with authority to access the property at the time when the authenticating the user occurred.

5. The method of claim 1, wherein providing the notification to the surveillance system comprises providing the notification to a server in communication with the surveillance system over a network.

6. The method of claim 1, wherein providing the notification to the surveillance system comprises providing an indication that the compartment of the lockbox has been opened, and the user is likely to enter the property.

7. The method of claim 1, further comprising providing a notification to an owner of the property and/or a manager of the property indicating that the user has been authenticated as an authorized user, and that the user has caused the compartment of the lockbox to open.

8. The method of claim 1, wherein updating the timestamped log for the property comprises indicating when the lockbox was opened.

9. The method of claim 1, further comprising, in response to causing the compartment of the lockbox to open, deactivating one or more component of a surveillance system installed at the property, wherein the one or more components comprises:
- a noise alarm;
- a notification to a law enforcement official and/or a fire department official;
- a notification to a surveillance monitoring service;
- a notification to an owner of the property and/or a manager of the property;
- a motion sensor installed at the property; or
- a camera installed at the property.

10. The method of claim 1, further comprising, in response to causing the compartment of the lockbox to open:
- activating a camera installed as part of the surveillance system installed at the property to capture a video stream of the property;
- determining whether the user has entered the property;
- in response to determining the user has entered the property, providing a notification to an owner of the property and/or a manager of the property with an indication that the user has entered the property; and
- storing the video stream of the property such that the owner of the property and/or the manager of the property can view the video stream.

11. A system comprising one or more processors configurable to execute instructions stored in non-transitory computer readable storage media, the instructions comprising:
- receiving a code input comprising a unique code, wherein the unique code is assigned to an account that is supported by a server in communication with a lockbox;
- authenticating a user based on the code input;
- accessing an authorization log to determine whether the user has permission to enter a property at a current time, wherein the authorization log comprises a listing of persons with authorization to access the property on certain dates and times;
- in response to determining the user has permission to enter the property at the current time, causing a compartment of the lockbox to open;
- providing a notification to a surveillance system indicating the user has been authenticated and accessed the compartment of the lockbox, wherein the notification comprises an identify of the user; and
- updating a timestamped visitor log for the property to indicate that the user accessed the property.

12. The system of claim 11, wherein the instructions are such that authenticating the user comprises authenticating by scanning a scannable code, and wherein the compartment of the lockbox is configured to hold a key to the property.

13. The system of claim 11, wherein the instructions are such that determining whether the user has permission to enter the property at the current time comprises determining that the user is a licensed real estate professional with authority to access the property when the property is for sale based on the authorization log.

14. The system of claim 11, wherein the instructions are such that determining whether the user has permission to enter the property at the current time further comprises determining the user is one or more of a visitor, real estate agent, interested buyer, registered guest, or contractor with authority to access the property at the time when the authenticating the user occurred.

15. The system of claim 11, wherein the instructions are such that providing the notification to the surveillance system comprises providing the notification to a server in communication with the surveillance system over a network.

16. Non-transitory computer readable storage media storing instructions for execution by one or more processors, the instructions comprising:
- receiving a code input comprising a unique code, wherein the unique code is assigned to an account that is supported by a server in communication with a lockbox;
- authenticating a user based on the code input;
- accessing an authorization log to determine whether the user has permission to enter a property at a current time, wherein the authorization log comprises a listing of persons with authorization to access the property on certain dates and times;
- in response to determining the user has permission to enter the property at the current time, causing a compartment of the lockbox to open;
- providing a notification to a surveillance system indicating the user has been authenticated and accessed the compartment of the lockbox, wherein the notification comprises an identify of the user; and
- updating a timestamped visitor log for the property to indicate that the user accessed the property.

17. The non-transitory computer readable storage media of claim 16, wherein the instructions are such that providing the notification to the surveillance system comprises providing an indication that the compartment of the lockbox has been opened, and the user is likely to enter the property.

18. The non-transitory computer readable storage media of claim 16, wherein the instructions further comprise providing a notification to an owner of the property and/or a manager of the property indicating that the user has been authenticated as an authorized user, and that the user has caused the compartment of the lockbox to open.

19. The non-transitory computer readable storage media of claim 16, wherein the instructions are such that updating the timestamped log for the property comprises indicating when the lockbox was opened.

20. The non-transitory computer readable storage media of claim 16, wherein the instructions further comprise, in response to causing the compartment of the lockbox to open, deactivating one or more component of a surveillance system installed at the property, wherein the one or more components comprises:
- a noise alarm;
- a notification to a law enforcement official and/or a fire department official;
- a notification to a surveillance monitoring service;
- a notification to an owner of the property and/or a manager of the property;
- a motion sensor installed at the property; or
- a camera installed at the property.

* * * * *